US012475261B2

(12) United States Patent
Soubhi

(10) Patent No.: US 12,475,261 B2
(45) Date of Patent: Nov. 18, 2025

(54) INTEGRATED CIRCUIT

(71) Applicant: Renesas Electronics Corporation, Tokyo (JP)

(72) Inventor: Mohamed Soubhi, Dusseldorf (DE)

(73) Assignee: Renesas Electronics Corporation, Tokyo (JP)

( * ) Notice: Subject to any disclaimer, the term of this patent is extended or adjusted under 35 U.S.C. 154(b) by 512 days.

(21) Appl. No.: 17/961,693

(22) Filed: Oct. 7, 2022

(65) Prior Publication Data

US 2023/0119255 A1    Apr. 20, 2023

(30) Foreign Application Priority Data

Oct. 19, 2021 (EP) ..................................... 21203520

(51) Int. Cl.
*G06F 21/72* (2013.01)
*G06F 12/14* (2006.01)
*G06F 15/78* (2006.01)

(52) U.S. Cl.
CPC .......... *G06F 21/72* (2013.01); *G06F 12/1408* (2013.01); *G06F 15/7842* (2013.01)

(58) Field of Classification Search
CPC ... G06F 21/72; G06F 12/1408; G06F 15/7842
See application file for complete search history.

(56) References Cited

U.S. PATENT DOCUMENTS

| 11,238,166 B2* | 2/2022 | Schramm | G06F 21/72 |
| 2010/0287443 A1* | 11/2010 | Rohleder | G06F 11/1645 710/110 |
| 2010/0318811 A1* | 12/2010 | Motoyama | G06F 7/00 708/250 |
| 2011/0191599 A1* | 8/2011 | Chou | H04L 9/0877 713/193 |
| 2019/0356468 A1* | 11/2019 | Zeh | H04L 9/0631 |
| 2020/0117814 A1* | 4/2020 | Ito | G06F 21/79 |
| 2020/0192742 A1 | 6/2020 | Boettcher et al. | |

OTHER PUBLICATIONS

Extended European Search Report dated Mar. 18, 2022 received in European Patent Application No. EP 21203520.8.

\* cited by examiner

*Primary Examiner* — Shanto Abedin
(74) *Attorney, Agent, or Firm* — SCULLY, SCOTT, MURPHY & PRESSER, P.C.

(57) ABSTRACT

An integrated circuit includes a safety processor and a secure computing module including a secure processor, first and second cryptographic units for encrypting and decrypting data, and first and second data transfer units for transferring data between a memory and the first and second cryptographic units respectively. The first cryptographic unit and the first data transfer unit provide a first cryptographic data handling system and the second cryptographic unit and the second data transfer unit provide a second cryptographic data handling system. The secure computing module includes selector circuitry for selectively coupling and uncoupling the first and second cryptographic units in response to control signals from a switch. In a first mode, the first and second cryptographic data handling systems are uncoupled and operable independently of each other. In a second mode, the first and second cryptographic data handling system are coupled and operable together to provide hardware redundancy.

13 Claims, 12 Drawing Sheets

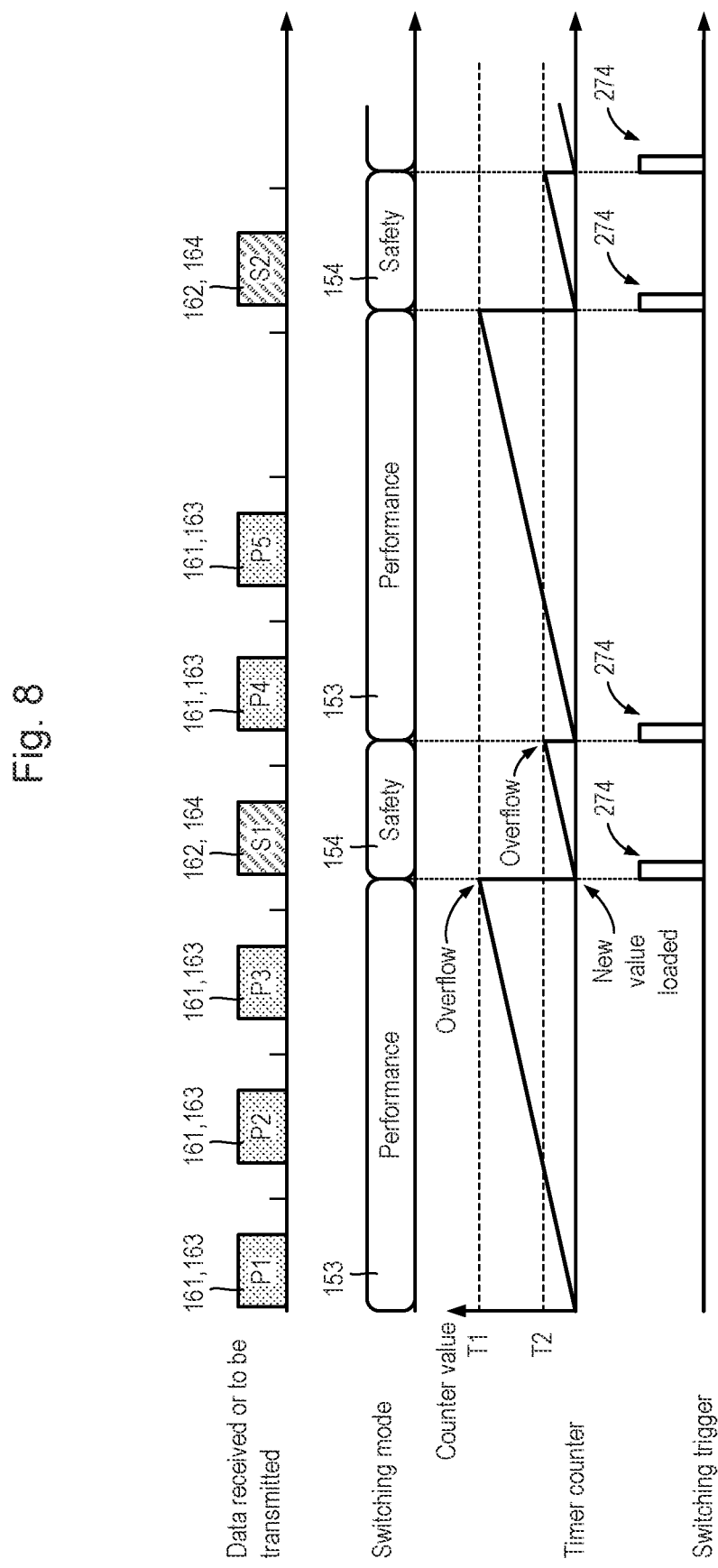

INTEGRATED CIRCUIT

CROSS-REFERENCE TO RELATED APPLICATION

The subject application claims priority to European Patent Application No. EP 21203520.8, filed on Oct. 19, 2021. The entire disclosure of European Patent Application No. EP 21203520.8 is incorporated into this application by this reference.

BACKGROUND

Field

The present disclosure relates to an integrated circuit, a vehicle comprising the integrated circuit, and a switching method.

Description of Related Art

Electronic control units (ECUs) are increasingly being introduced into motor vehicles in a wide range of automotive domains, such as powertrain, chassis, body, active safety, driver assistance, passenger comfort and infotainment. Not only is the number of ECUs embedded in a vehicle rising, but also these units are becoming ever more interconnected.

ECUs are expected to comply with functional safety standards. For example, automotive electric and electronic systems are required to comply with the ISO 26262 standard. Moreover, as with any networked computer system, automotive electronic systems are vulnerable to attack by external malicious entities, and so they should also include measures to make them secure, i.e., to meet security requirements.

Thus, attention is being directed to systems which satisfy both safety and security requirements, and an example of a system which satisfies these requirements can be found in US 2020/0117814 A1, which is incorporated herein by reference.

SUMMARY

According to a first aspect of the present disclosure, there is provided an integrated circuit. The integrated circuit comprises a safety processor, a memory and a secure computing module. The secure computing module comprises a secure processor, first and second cryptographic units for encrypting and decrypting data in the memory, and first and second data transfer units for transferring data between the memory and the first and second cryptographic units respectively. The first cryptographic unit and the first data transfer unit provide a first cryptographic data handling system and the second cryptographic unit and the second data transfer unit provide a second cryptographic data handling system. The integrated circuit further comprises a switch and the secure computing module further comprises selector circuitry for selectively coupling and uncoupling the first and second cryptographic handling systems in response to control signals from the switch, such that, in a first mode, the first and second cryptographic data handling systems are uncoupled and operable independently of each other and, in a second mode, the first and second cryptographic data handling systems are coupled and operable together to provide hardware redundancy.

Thus, the transfer units and the cryptography units can be selectively switched between a first mode in which secure, non-safety-related data or authentication-only data can be handled at a relatively high throughput and a second mode in which secure, safety-related data can be handled at a relatively low throughput.

The first and second cryptographic data handling systems may be operable for time-diverse error detection. The first and second cryptographic data handling systems may be operable in dual core lock step (DCLS).

The secure computing module comprises an interface for interfacing with the safety processor and the memory, the interface comprising first and second interface circuits operable together to provide hardware redundancy. The first and second interface circuits may be arranged in DCLS.

The safety processor may comprise first and second cores operable together to provide hardware redundancy. The first and second cores may be arranged for time-diverse error detection. The first and second cores may be arranged in DCLS.

The secure computing module may comprise a hardware security module (HSM). The first and second cryptographic units may comprise first and second Advanced Encryption Standard (AES) units respectively. The first and second cryptographic units may comprise first and second SM4 block cipher units respectively. The first and second data transfer units may comprise first and second direct memory access (DMA) controllers respectively. The first and second cryptographic units may be arranged such that, when coupled to provide a redundancy-incorporating cryptographic unit, the redundancy-incorporating cryptographic unit is able to support AES Galois/Counter Mode (AES-GCM) operation.

In the first mode, the first cryptographic data handling system may be operable to process first data stored in the memory and the second first cryptographic data handling system is operable to process second, different data stored the memory, simultaneously. In the second mode, the first and second cryptographic data handling systems may be operable to process the first and second data sequentially.

The safety processor may be configured, in response to receiving or transmitting encrypted safety data, to send a request to the switch to cause the secure computing module to switch from the first mode to second mode.

The switch may comprise a state monitor and the selector circuitry may comprise a set of selectors. Each selector in the set of selectors may be arranged to communicate its state to the state monitor. The switch may be configured to determine the respective states of the selectors in the set of selectors and, upon determining the states are in the correct respective states, to switch states.

The secure computing module may further comprise a cryptographic signature or hash engine. The cryptographic signature or hash engine may be a first cryptographic signature or hash engine and the secure computing module may further comprise a second signature engine. The first cryptographic data handling system and the first cryptographic signature or hash engine are operable to process a first code block in a booting process and the second cryptographic data handling system and the second cryptographic signature or hash engine are operable to process a second code block during the booting process.

The integrated circuit may further comprise a communications controller for receiving and transmitting data from a bus. The communications controller may be operable to receive received data and to store the received data in the memory and to retrieve transmit data from the memory and to transmit the transmit data. The communications controller may be an Ethernet controller. The communications controller may be a controller area network (CAN) controller. The CAN controller may be operable to CAN 2.0 and/or CAN FD standards. The communications controller may be a FlexRay controller.

The switch may comprise a scheduler and a timer. The scheduler may be configured, in response to the timer reaching a first pre-defined value T1, to cause the secure computing module to switch from the first mode to the second mode and, in response to the time reaching a second pre-defined value T2, to cause the secure computing module to switch from the second mode to the first mode.

The integrated circuit may further comprise an error module. The switch may be configured to monitor states of selectors in the selector circuitry and, in response to a given selector or the switch determining that the given selector is in an erroneous state, the given selector and/or switch sending an error signal to the error module.

The hardware redundancy in the integrated circuit is preferably sufficient to support Automotive Safety Integrity Level (ASIL) level D.

The integrated circuit may be a microcontroller or a system-on-a-chip (SoC).

According to a second aspect of the present disclosure, there is provided a vehicle, such as a motor vehicle, comprising a communications bus and at least two nodes arranged to communicate via the communications bus, each node comprising an integrated circuit of the first aspect.

The motor vehicle may be a motorcycle, an automobile (sometimes referred to as a "car"), a minibus, a bus, a truck or lorry. The motor vehicle may be powered by an internal combustion engine and/or one or more electric motors.

According to a third aspect of the present disclosure, there is provided a switching method. The method comprises selectively coupling and uncoupling first and second cryptographic data handling systems. The first cryptographic data handling system may comprise a first cryptographic unit and a first data transfer unit and the second cryptographic data handling system may comprise a second cryptographic unit and a second data transfer unit. In a first mode, the first and second cryptographic data handling systems uncoupled and operable independently of each other and, in a second mode, the first and second cryptographic data handling system are coupled and operable together to provide hardware redundancy.

The method may comprise coupling the first and second cryptographic data handling systems in response to a request from a safety processor and, later, uncoupling the first and second cryptographic data handling systems. Uncoupling the first and second cryptographic data handling systems may be in response to finishing processing a set of data. Uncoupling the first and second cryptographic data handling systems may be in response to another request from the safety processor.

The method may comprise coupling the first and second cryptographic data handling systems in response to a timer value reaching a predetermined timer value threshold and, later, uncoupling the first and second cryptographic data handling systems. Uncoupling the first and second cryptographic data handling systems may be in response to the timer reaching another predetermined timer value threshold.

BRIEF DESCRIPTION OF THE DRAWINGS

Certain embodiments of the present disclosure will now be described, by way of example, with reference to the accompanying drawings, in which:

FIG. 9 is a schematic diagram illustrating automatic switching between performance and safety modes;

DETAILED DESCRIPTION

Figure 1:
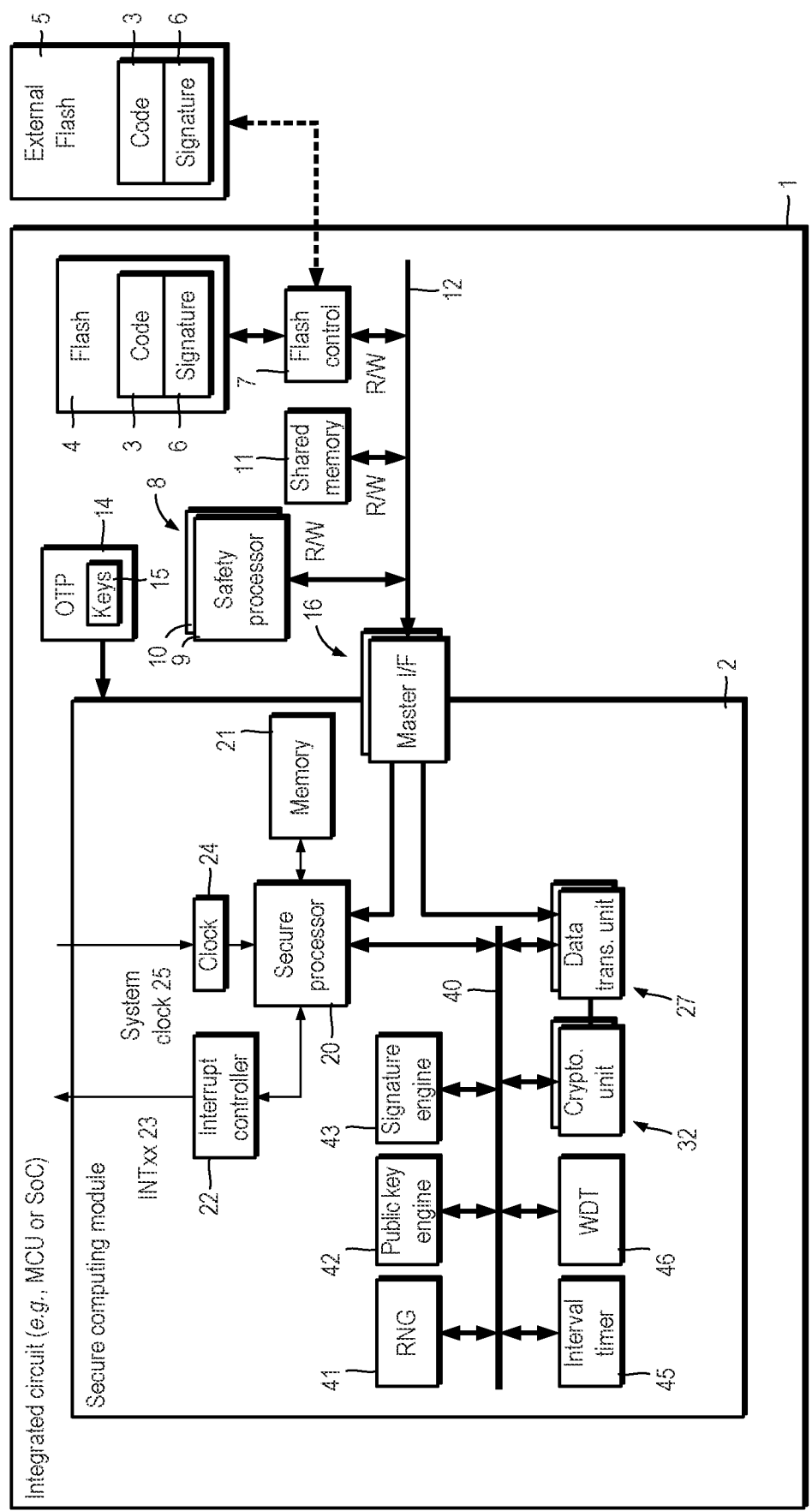
FIG. 1 is a schematic block diagram of a first example of an integrated circuit.

In the following description, like parts are denoted by like reference numerals.

INTRODUCTION

It is desirable for microcontrollers and systems-on-a-chips (SoCs) to be able to handle, among others, two specific use cases, namely secure boot to detect manipulated code and secure communication to detect manipulated message data.

Hitherto, functional safety and security have been treated separately in such devices. It is, however, desirable to combine functional safety and security for a number of different reasons, such as, for example, trying to avoid conflicting requirements in functional safety and security, and to reduce complexity of devices.

In addition to these, integrity, which is a property found in security, can also be put to use in functional safety. In the case of secure boot, integrity of code which in embedded or external flash memory can be checked. Checking the integrity of the code can render the need for performing an additional cyclic redundancy check (CRC) of the code unnecessary and so help to speed-up start time of the device. In the case of secure communication, integrity of message data can be checked using a security measure, such as cipher-based message authentication code (CMAC) or encryption with a digest tag. Checking the integrity of the message data in one of these ways means that additional end-to-end protection superfluous.

To handle the secure boot and secure communication use cases, a microcontroller or an SoC can use a secure computing module in the form of an HSM.

Referring to FIG. 1, a first integrated circuit 1 for use in safety-related applications is shown.

The integrated circuit 1 takes the form of a microcontroller or an SoC, and includes a secure computing module 2 in the form of an HSM for handling secure boot and secure communication. For example, at start-up, the integrated circuit 1 obtains code 3, either from embedded flash memory 4 or from external flash memory 5. The veracity of the code 3 can be checked using a signature or hash 6 (herein after simply referred to as a "signature").

The integrated circuit 1 includes, among other things, a flash memory controller 7 and a redundancy-incorporating (or "high-reliability") safety processor 8 (or "safety control unit"). The safety processor 8 is provided with redundancy by virtue of, for example, using two cores 9, 10 arranged in DCLS or other suitable arrangement. In FIG. 1, DCLS circuitry, such as flip-flops, is not shown for clarity. The integrated circuit 1 also includes shared memory 11 (or "system memory") in the form of random-access memory (RAM) and a bus system 12.

The integrated circuit 1 comprises other elements, such general input/output modules (not shown), communication controllers (not shown) and other peripheral modules (not shown), but which are omitted from FIG. 1 to aid clarity.

The secure computing module 2 is provided with one-time programmable (OTP) read-only non-volatile memory 14 for example in the form of an eFuse for providing secure keys 15 to the secure computing module 2. The secure computing module 2 includes a redundancy-incorporating interface 16 (herein referred to as a "master interface"), a secure processor 20 provided with memory 21, an interrupt controller 22 which can generate interrupts 23 and a local clock 24 which receive a system clock signal 25.

The secure computing module 2 includes a redundancy-incorporating data transfer unit 27 in the form of a redundancy-incorporating direct memory access (DMA) controller. The redundancy-incorporating data transfer unit 27 is provided with suitable redundancy, for example, using DCLS. The master interface 16 can communicate directly with the secure processor 20 and the redundancy-incorporating data transfer unit 27. The redundancy-incorporating data transfer unit 27 is also able to communicate directly with a redundancy-incorporating cryptography unit 32 in the form of a redundancy-incorporating Advanced Encryption Standard (AES) unit. The redundancy-incorporating cryptography unit 32 is provided with suitable redundancy, for example, using DCLS, and is able to support AES Galois/Counter Mode (AES-GCM) operation. The redundancy-incorporating data transfer unit 27 is provided with suitable redundancy to support AES-GCM operation. During AES-GCM operation, message data is encrypted at a sender (not shown) and decrypted at a receiver (not shown).

The secure processor 20, the redundancy-incorporating data transfer unit 27 and the redundancy-incorporating cryptography unit 32 are connected to a module bus system 40. The secure computing module 2 also includes a random number generator 41 (RNG) in which can generate true random numbers and/or pseudorandom numbers, a public key cryptographic engine 42, a cryptographic signature or hash engine 43 herein referred to simply as a "signature engine") for generating a signature or hash, an interval timer 45 and a watchdog timer 46 ("WDT") connected to the module bus system 40.

In end-to-end communication, there is a trend towards the use of domain controllers and zone servers and gateways. Thus, the amounts of secure communication and high-performance (i.e., high throughput) processing are likely to increase, and the volume of safety-related security communication in AES-GCM mode is also likely to rise. Redundancy, however, cannot be relaxed and yet using redundancy generally halves performance. Furthermore, only a proportion (for example, less than 20% or 30%) of secure messages may be safety-related.

One solution to maintaining or increasing performance is to add hardware accelerators.

Figure 2:
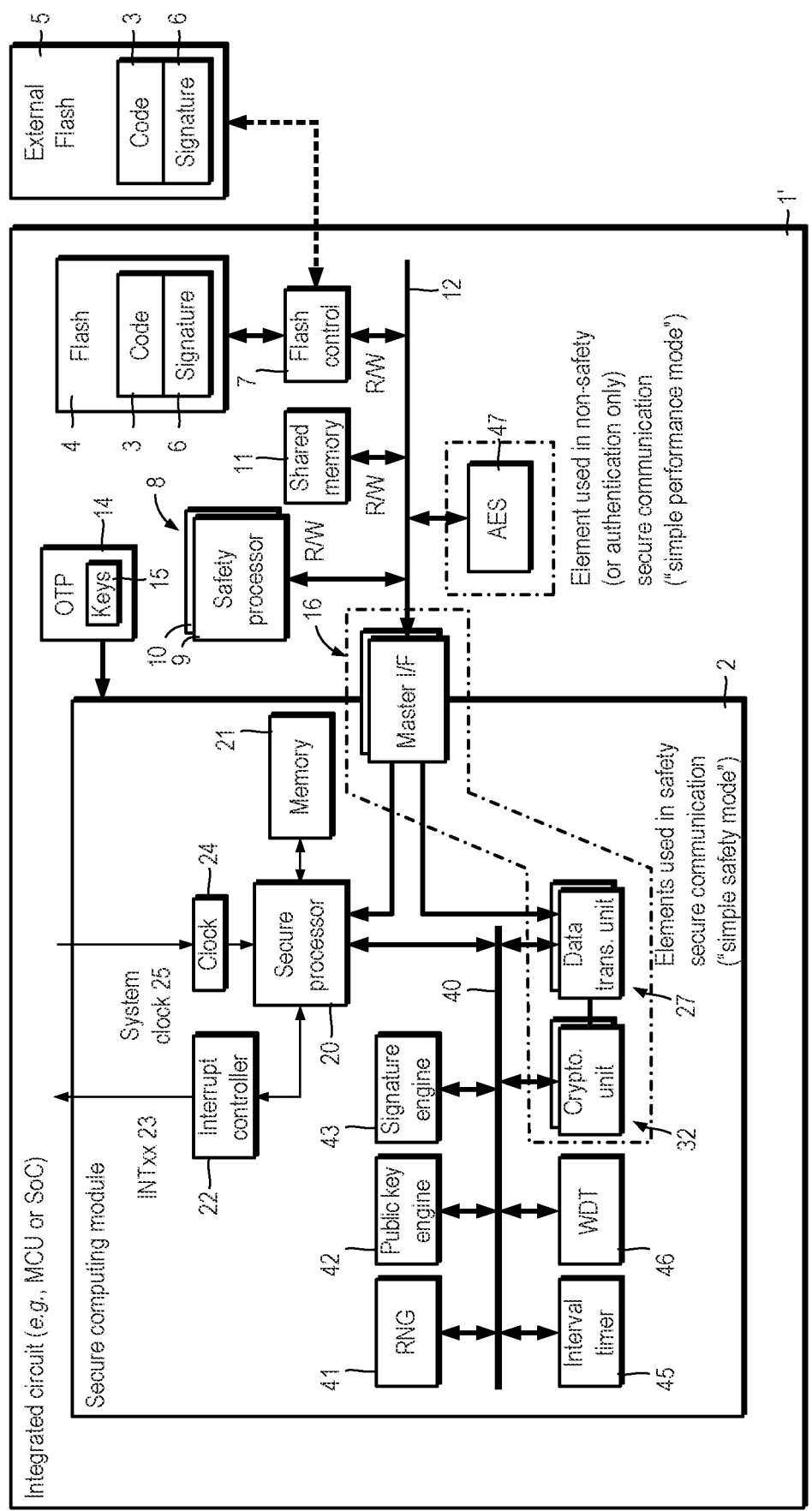
FIG. 2 is a schematic block diagram of a second example of an integrated circuit.

Referring to FIG. 2, a second integrated circuit 1' is shown. The second integrated circuit 1' is the same as the first integrated circuit 1 (FIG. 1), but differs in that it includes an additional hardware accelerator in the form of a (non-redundancy-incorporating) cryptography unit 47 outside of the secure computing module 2.

Redundancy-incorporating parts 32, 27 of the secure computing module 2 are used for secure communication employing AES-GCM, while the cryptography unit 47 is used for secure, non-safety-related communication and for safety communication that requires only authentication, such as CMAC. This approach, however, increases complexity, die size and cost.

Integrated Circuit Having a Dynamic Switch

Figure 3:
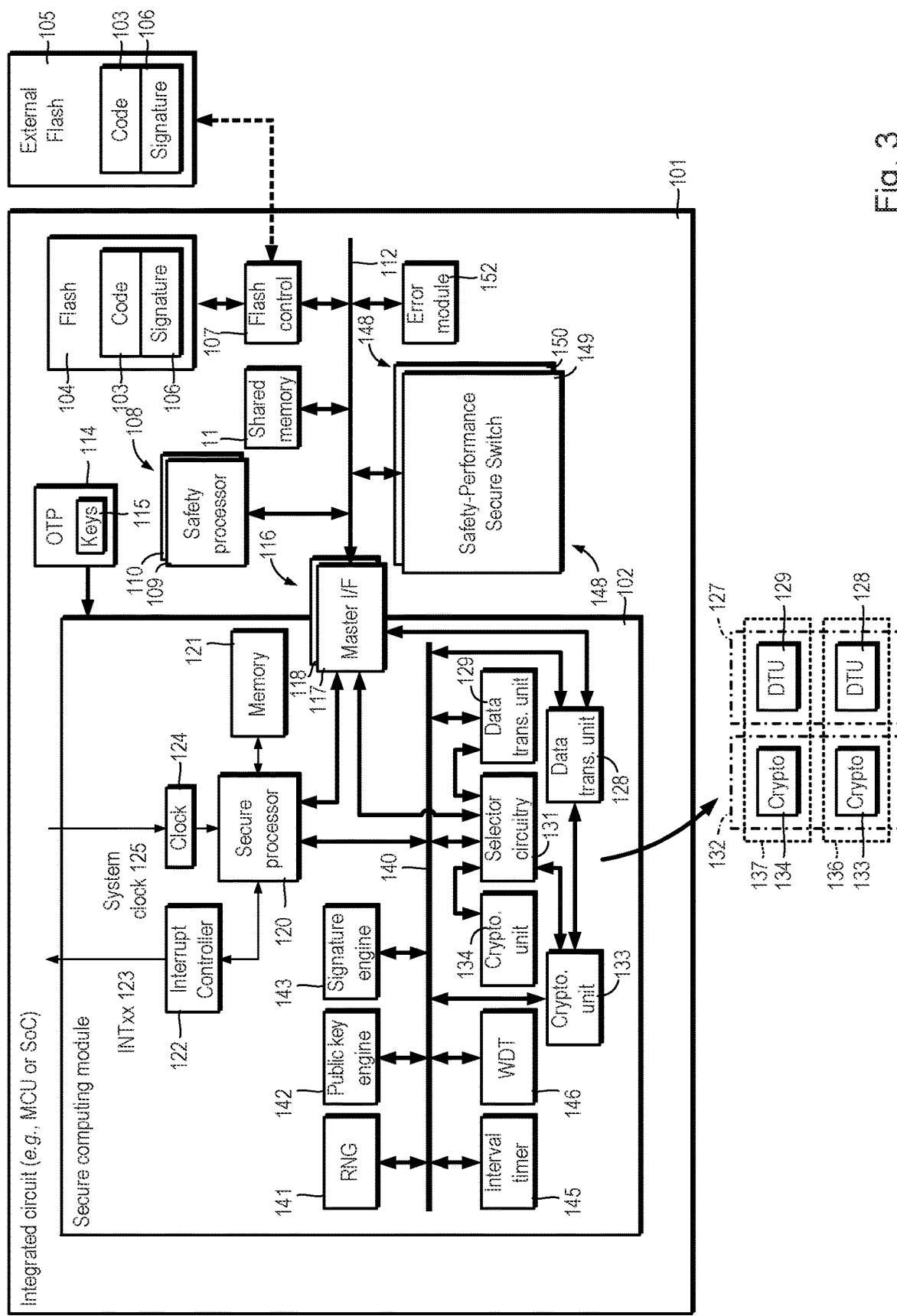
FIG. 3 is a schematic block diagram of an integrated circuit which includes an HSM and a safety-performance secure switch.

Referring to FIG. 3, a third integrated circuit 101 is shown.

The integrated circuit 101 takes the form of a microcontroller or an SoC, and includes a secure computing module 102 in the form of an HSM for handling secure boot and secure communication. For example, at start-up, the integrated circuit 101 obtains code 103, either from embedded flash memory 104 or from external flash memory 105. The veracity of the code 103 can be checked using a signature or hash 106.

The integrated circuit 101 includes, among other things, a flash memory controller 107 and a redundancy-incorporating safety processor 108 (or "safety control unit"). The safety processor 108 executes safety-related applications (not shown). The safety processor 108 is arranged to satisfy safety requirements for an application up to Automotive Safety Integrity Level (ASIL) level C or D (as defined by ISO 26262). Thus, the safety processor 108 is provided with redundancy by virtue of, for example, using two cores 109, 110 (a "master core" and a "checker core") arranged in DCLS or other suitable time-diverse arrangement. In FIG. 3, DCLS circuitry, such as flip-flops, is not shown for clarity. If a lower level of safety requirement is sufficient, then other less-stringent error-detecting arrangements can be used such as simple-redundancy or a single core with a self-check.

The integrated circuit 101 also includes shared memory 111 (or "system memory") and a bus system 112. The integrated circuit 101 comprises other elements, such general input/output modules (not shown), communication controllers 113 (FIG. 11) and other peripheral modules (not shown), but which are omitted from FIG. 3 to aid clarity.

The secure computing module 102 is provided with an OTP in the form of an eFuse 114 for providing secure keys 115.

The secure computing module 102 includes a redundancy-incorporating interface 116 (herein referred to as a "master interface") which comprise two interface circuits 117, 118 ("master interface" and "checker interface") and time-diverse error detection circuitry (not shown) for providing redundancy, a secure processor 120 provided with memory 121, an interrupt controller 122 which can generate interrupts 123 and a local clock 124 which receive a system clock signal 125.

The secure computing module 102 includes a redundancy-capable data transfer unit 127 (herein sometimes referred to as "DTU") which comprises first and second data transfer units 128, 129 and time-diverse error detection circuitry (not shown) for providing redundancy. The first and second data transfer units 128, 129 take the form of respective DMA controllers.

As will be explained in more detail hereinafter, the first and second data transfer units 128, 129 are arranged to be selectively coupled and de-coupled via selector circuitry 131 so that they can operate together, in parallel, so as to provide time-diverse redundancy based on, for example, DCLS or other suitable arrangement, or separately so as to provide two independently-operable data transfer units 128, 129.

The master interface 116 can communicate directly with the secure processor 120 and, either directly or via selector circuitry 131, with the data transfer unit 128, 129.

The secure computing module 102 also includes redundancy-capable cryptography unit 132 which comprises first and second cryptography units 133, 134 for providing time-diverse redundancy. The first and second cryptography units 133, 134 take the form of respective AES units.

As will be explained in more detail hereinafter, the first and second data first and second cryptography units 133, 134 are arranged so that, in a first mode ("performance mode"), they can operate separately so as to provide two independently-operable cryptography units 133, 134 each working with a respective data transfer unit 128, 129 as respective first and second cryptographic data handling systems 136, 137 or, in a second mode (or "encrypted/decrypted safety mode" or simply "safety mode"), they can operate together, in parallel, and so provide time-diverse redundancy based on DCLS or other suitable arrangement to support AES-GCM operation (or other suitable form of authenticated encryption).

The secure processor 120, the data transfer units 128, 129 and the redundancy-incorporating cryptography unit 132 are connected to an internal module bus system 140 (or simply "module bus"). The secure computing module 102 also includes a random number generator 141 for generating true random numbers and/or pseudo random numbers, a public key cryptographic engine 142, a cryptographic signature or hash engine 143 (herein referred to simply as a "signature engine"), an interval timer 145 and a WDT 146 connected to the module bus 140.

Circuity 131 (herein referred to as "selector circuitry" or "switching circuitry") is provided in the secure computing module 102 to control data paths between the transfer units 128, 129 and the cryptography units 133, 134, the master interface 116 and the module bus 140.

Outside the secure computing module 102, switching between modes is controlled and monitored using a redundancy-incorporating switch 148 (herein referred to as a "safety-performance secure switch" or "SPSS") comprising first and second switch circuits 149, 150 and circuitry (not shown) for providing time-diverse redundancy.

The integrated circuit 101 also includes an error module 152. The error module 152 collects error signals from safety mechanisms implemented in hardware and, based on the error signals and a configurable set of rules, takes action, such as perform a reset or transmit an error signal outside the device 101 to an external device (not shown).

Using the selector circuitry 131 and the SPSS 148, the transfer units 128, 129 and the cryptography units 133, 134 can be switched (on demand or automatically based predefined rules) between performance mode in which two separate cryptographic data handling systems 136, 137 can operate independently of each other to process secure non-safety-related data or safety-related data requiring only authentication in parallel or the safety mode in which there is hardware redundancy to support secure, safety-related mode of operation, such as AES-GCM.

The safety processor 108 can request switching on demand (i.e., asynchronously). Alternatively, a programmable scheduler 232 (FIG. 7) with an embedded timer 233 (FIG. 7) can provide automatic switching (i.e., synchronously).

Performance mode is the default mode. Thus, the transfer units 128, 129 and cryptography units 133, 134 normally operate in performance mode and, when necessary, switch to safety mode, then switch back to performance mode once processing in safety mode is completed.

As will be described in more detail hereinafter, the selector circuitry 131 provides feedback to the SPSS 148 to allow state monitoring. Furthermore, error monitoring and notification is used to report errors to the error module 152, for example, for the purpose of redundancy and/or for identifying incorrect selectors states. The SPSS 148 is preferably configured to switch only when the secure computing module 102 is ready, for instance, after any pending tasks by the transfer units 128, 129 and cryptography units 133, 134 are completed.

As will also be described in more detail hereinafter, an additional signature or hash engine 144 (FIG. 9) may be used to provide redundancy and so provide acceleration for secure boot.

Figure 4:
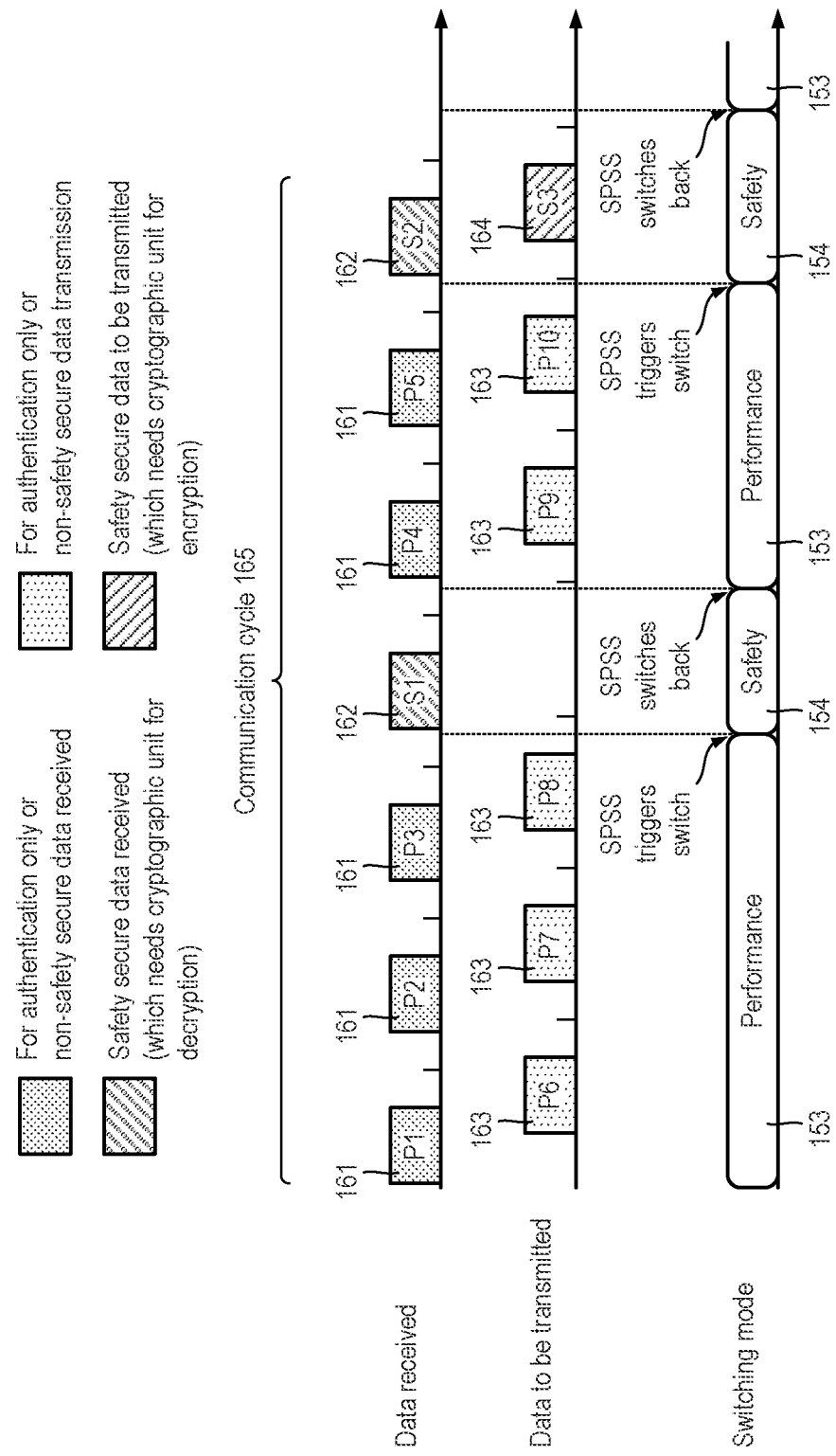
FIG. 4 is a timing diagram illustrating switching between performance and safety modes.

Referring also to FIG. 4, switching between performance and safety modes 153, 154 for processing received secure, non-safety-related data 161, received secure, safety-related data 162, to-be-transmitted secure, non-safety-related data 163 and to-be-transmitted secure, safety-related data 164 in a communication cycle 165 is shown.

Prior to receiving secure, safety-related data 162, received secure, non-safety-related data 161 and to-be-transmitted secure, non-safety-related data 163 are processed in parallel by the secure computing module 102 in performance mode 153. If secure, safety-related data 162 are received, then the SPSS 148 triggers the switch to safety mode 154 and the received secure, safety-related data 162 are processed by the secure computing module 102 in safety mode 154 (at a lower throughput). Once completed, the SPSS 148 switches the secure computing module 102 back to performance mode 153 up on request from the safety core 108 and further received secure, non-safety-related data 161 and to-be-transmitted secure, non-safety-related data 163 are processed in parallel in performance mode 153 until secure, safety-related data 162 are received and/or secure, safety-related data 163 is to be transmitted.

Figure 5:
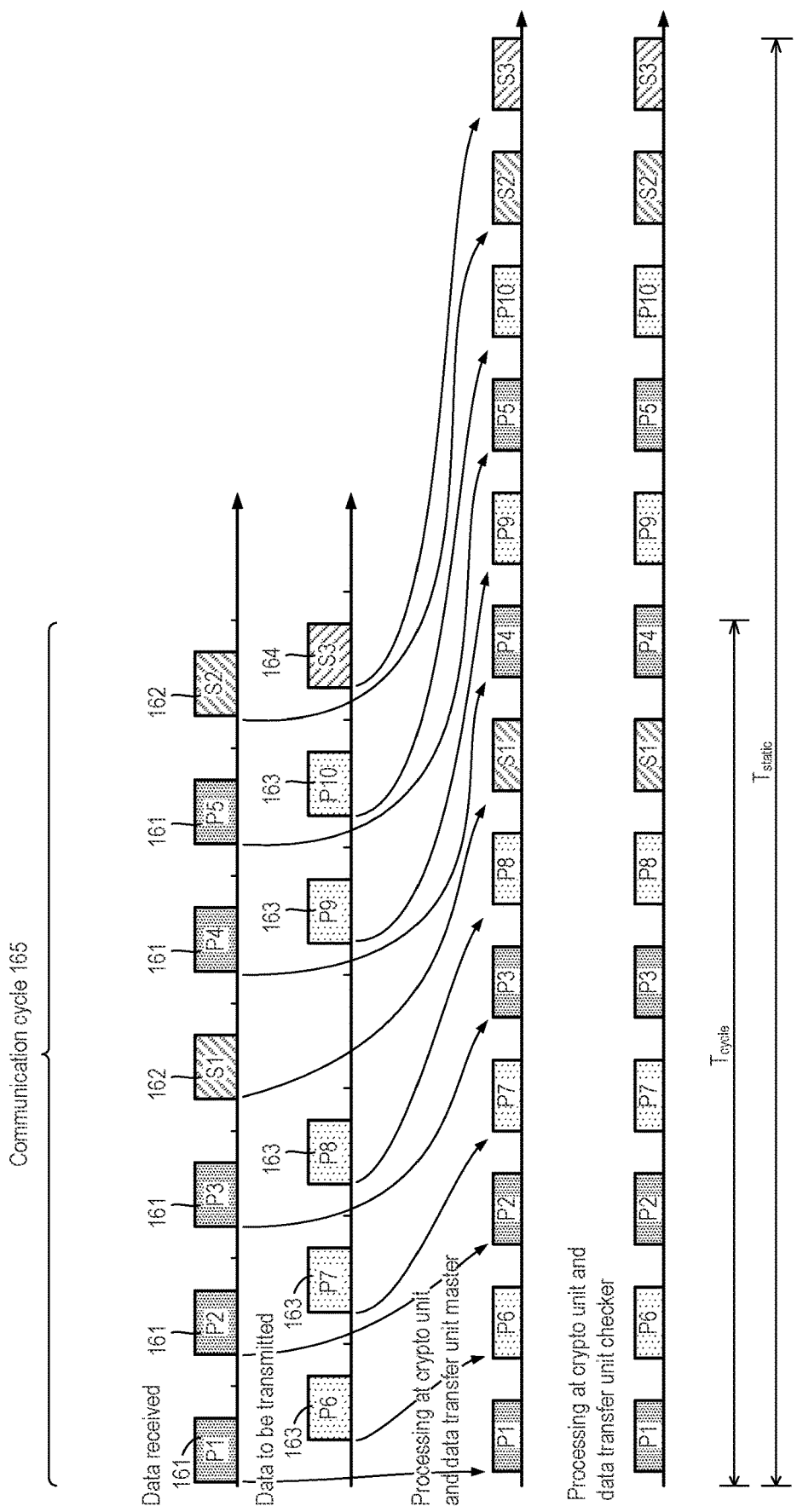
FIG. 5 is a timing diagram illustrating, for a comparative example, processing of received non-safety-related secure data, received safety-related secure data, to-be-transmitted non-safety-related secure data and to-be-transmitted safety-related secure data without switching dynamically between performance and safety modes.
Figure 6:
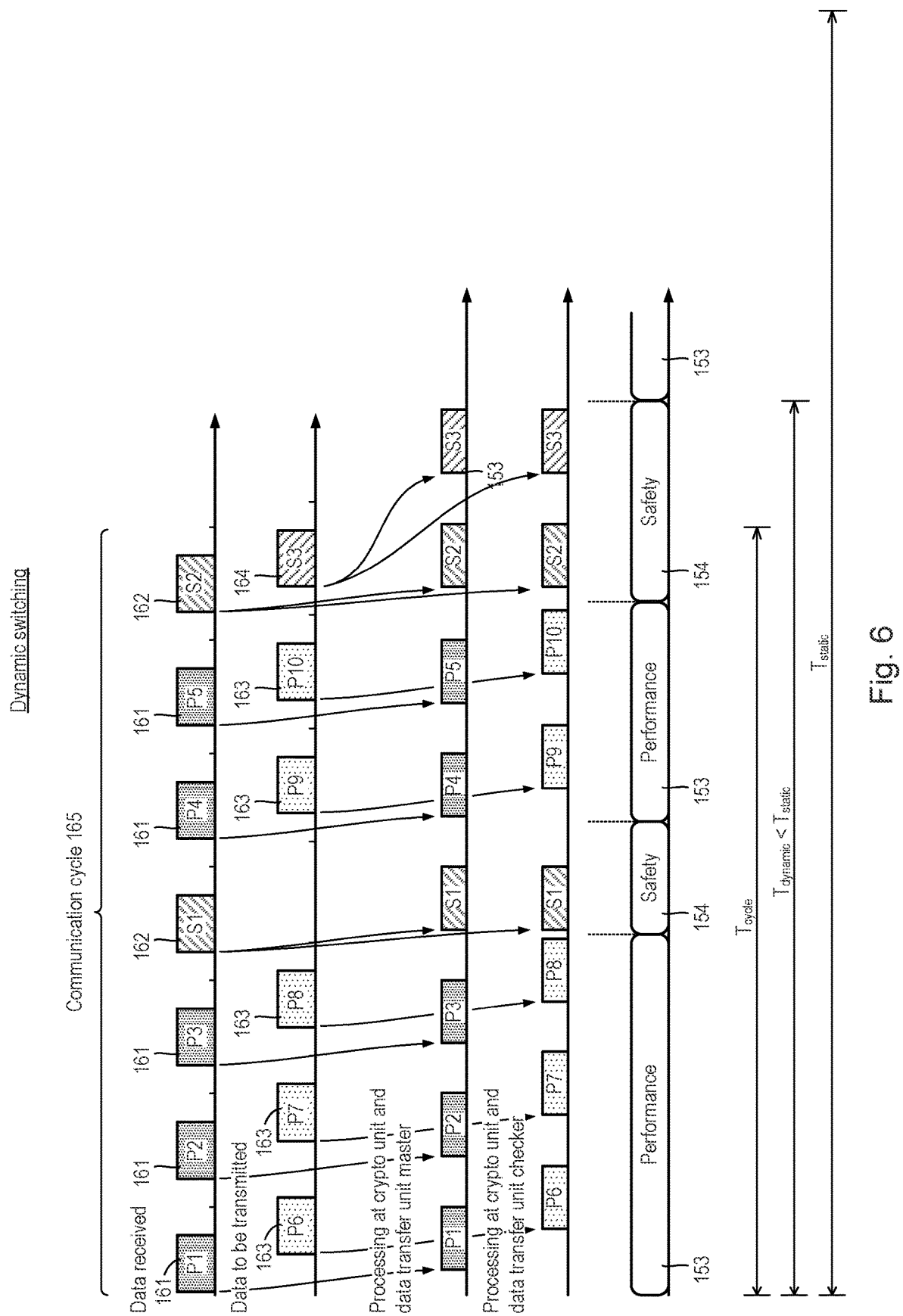
FIG. 6 is a timing diagram illustrating processing of received non-safety-related secure data, received safety-related secure data, to-be-transmitted non-safety-related secure data and to-be-transmitted safety-related secure data by switching dynamically between performance and safety modes.

Referring to FIGS. 5 and 6, relative gain in performance achieved by dynamically switching between performance and safety modes 153, 154 is schematically illustrated over the course of a communication cycle 165 having a duration $T_{cycle}$.

Referring in particular to FIG. 5, using static redundancy provided by the first integrated circuit 1 (FIG. 1), the secure computing module 2 (FIG. 1) processes all received secure, non-safety-related data 161 and to-be-transmitted secure, non-safety-related data 163 are processed sequentially, in this case, in an interleaved way. The secure computing module 2 (FIG. 1) then processes the received secure, safety-related data 162. The secure computing module 2

(FIG. 1) then continues to process further received secure, non-safety-related data 161 and to-be-transmitted secure, non-safety-related data 163 are processed sequentially. The time taken by the secure computing module 2 (FIG. 1) to process the received and to-be-transmitted data 161, 162, 163, 164 in the communication cycle 165 is $T_{static}$, where $T_{static} > T_{cycle}$.

Referring in particular to FIG. 6, using dynamic redundancy, received secure, non-safety-related data 161 and to-be-transmitted secure, non-safety-related secure data 163 are processed in parallel by the secure computing module 102 (FIG. 3) in performance mode 153. Accordingly, the time taken by the secure computing module 102 (FIG. 3) to process the received and to-be-transmitted data 161, 162, 163, 164 in the communication cycle 165 is $T_{dynamic} < T_{static}$.

Figure 7:
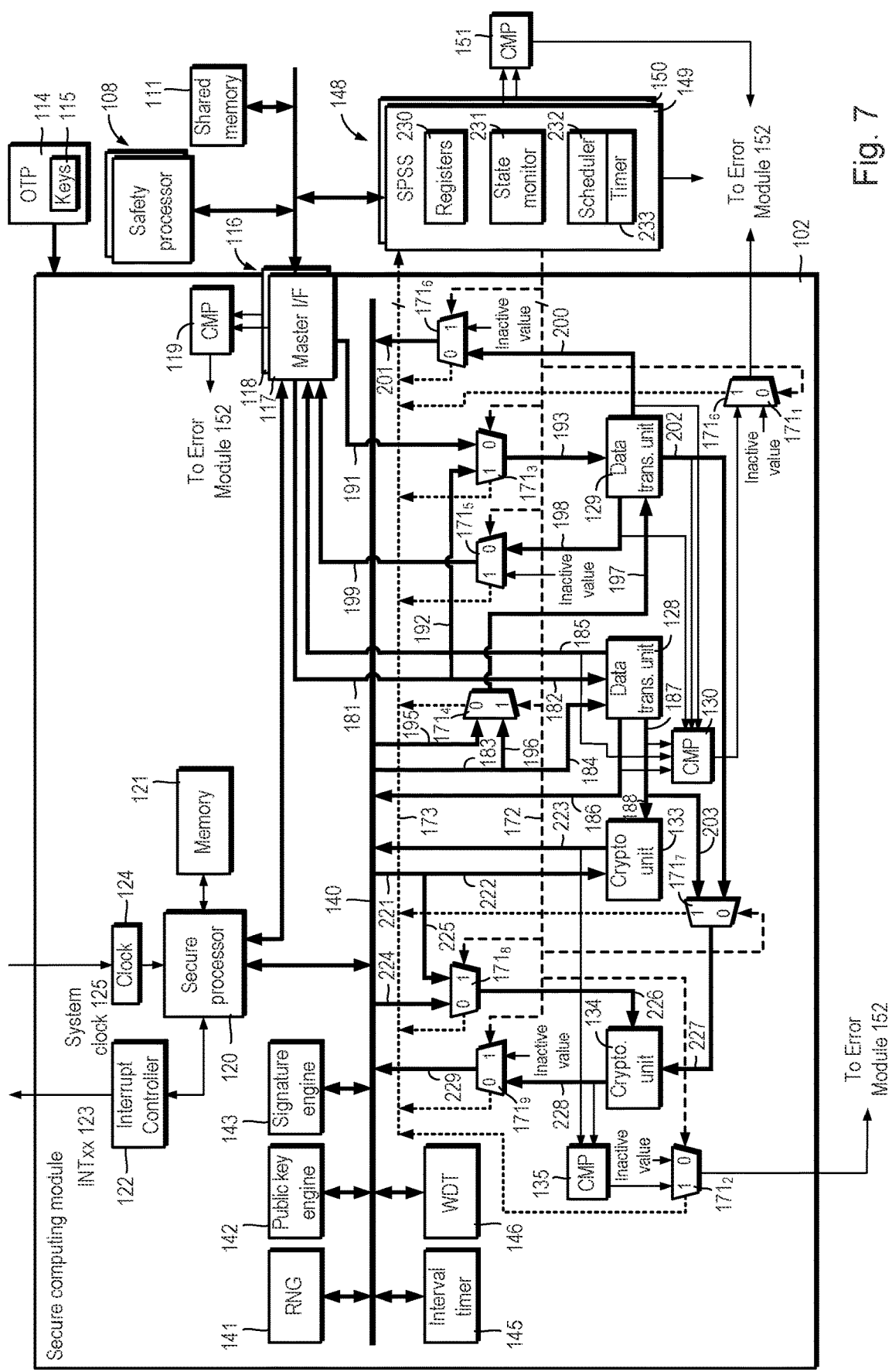
FIG. 7 is a schematic block diagram of the HSM and the safety-performance secure switch shown in FIG. 3.

Referring to FIG. 7, the secure computing module 102 and SPSS 148 are shown in more detail.

As explained earlier, the master interface 116, the data transfer units 128, 129, the cryptography units 133, 134 and the SPSS 148 are provided with error detection circuitry as part of a redundancy provision. In particular, the master interface 116 is provided with a first comparator 119 which compares the respective outputs of the two interface circuits 117, 118 in which a time delay (e.g., two clock cycles) is introduced at different points in separate paths based on the DCLS principle. For instance, a delay is introduced before the first interface circuit 117 and a corresponding delay is added after the second interface circuit 118. Delay circuits for providing DCLS are not shown for clarity. The data transfer units 128, 129 are provided with a second comparator 130 which compares the respective outputs (in this case, three outputs) of the data transfer units 128, 129 in which a time delay is introduced at different points in separate paths based on the DCLS principle. Delay circuits for providing DCLS are not shown for clarity. The cryptography units 133, 134 are provided with a third comparator 135 which compares the respective outputs (in this case, two outputs) of cryptography units 133, 134 in which a time delay is introduced at different points in separate paths based on the DCLS principle. Delay circuits for providing DCLS are not shown for clarity. The SPSS 148 is provided with a fourth comparator 151 which compares outputs of the first and second switch parts 149, 150 in which a time delay is introduced at different points in separate paths based on the DCLS principle. Delay circuits for providing DCLS are not shown for clarity. If an error is detected by a comparator 119, 130, 135, 151, then the comparator 119, 130, 135, 151 transmits an error signal to the error module 152.

The selector circuitry 131 includes a set of (in this case, nine) selectors $171_1$, $171_2$, $171_3$, $171_4$, $171_5$, $171_6$, $171_7$, $171_8$, $171_9$ (collectively referred to as "selectors 171"). The selector circuitry 131 may include more or fewer selectors 171 and/or the selectors 171 may be differently arranged.

Each of the selectors 171 receives respective control signals from the SPSS 148 via a selector control line 172 and returns respective selector states to the SPSS 148 via a selector state line 173.

Each of the selectors 171 has first and second inputs, namely '0' and '1'. The input '0' is selected when operating in performance mode and '1' is selected when operating in safety mode.

First and second selectors $171_1$, $171_2$ are used for state monitoring when operating in safety mode. The first selector $171_1$ receives an output from the second comparator 130 which is used for monitoring the first and second data transfer units 128, 129 when they operate in concert as a redundancy-incorporating data transfer unit 127 (FIG. 3).

Likewise, the second selector $171_2$ receive an output from the third comparator 135 which is used to monitor the first and second cryptographic units 133, 134 when operating together as redundancy-incorporating cryptographic unit 132 (FIG. 3). The first and second selectors $171_1$, $171_2$ signal error states to the error module 152.

The master interface 116, the data transfer units 128, 129, the cryptographic unit 133, 134, module bus 140 and selectors 171 are connected by a plurality of data paths 181, . . . , 229.

A first data path 181, 182 runs from the master interface 116 to the first data transfer unit 128. A second data path 183, 184 runs from the module bus 140 to the first data transfer unit 128. A third data path 185 runs from the first data transfer unit 128 to the master interface 116. A fourth data path 186 runs from the first data transfer unit 128 to the module bus 140. A fifth data path 187, 188 runs from the first data transfer unit 128 to the first cryptography unit 133.

A sixth data path 191 runs from the master interface 116 to a first input of a third selector $171_3$. A seventh data path 181, 192 runs from the master interface 116 to a second input of a third selector $171_3$. A section 181 of the seventh data path 181, 192 from the master interface 116 is shared with the first data path 181, 182. An eighth data path 193 runs from the output of the third selector $171_3$ to the second data transfer unit 129. The third selector $171_3$ is used for switching the eighth data path 193 into the second data transfer unit 129 between the sixth and seventh data paths 191, 192 in performance mode and safety mode respectively.

A ninth data path 195 runs from the module bus 140 to a first input of a fourth selector $171_4$. A tenth data path 183, 196 runs from the module bus 140 to a second input of a fourth selector $171_4$. A section 183 of the tenth data path 183, 196 from the module bus 140 is shared with the second data path 183, 184. An eleventh data path 197 runs from the output of the fourth selector $171_4$ to the second data transfer unit 129. The fourth selector $171_4$ is used for switching the eleventh data path 197 between the ninth and tenth data paths 195, 196 in performance mode and safety mode respectively.

A twelfth data path 198 runs from the second data transfer unit 129 to a first input of a fifth selector $171_5$. The second input of the fifth selector $171_5$ receives an inactive value. A thirteenth data path 199 runs from the output of the fifth selector $171_5$ to the master interface 116.

A fourteenth data path 200 runs from the second data transfer unit 129 to a first input of a sixth selector $171_6$. The second input of the sixth selector $171_6$ receives an inactive value. A fifteenth data path 201 runs from the output of the sixth selector $171_6$ to the module bus 140.

A sixteenth data path 202 runs from the second data transfer unit 129 to a first input of a seventh selector $171_7$. A seventeenth data path 187, 203 runs from the first data transfer unit 128 to the second input of the seventh selector $171_7$. A section 187 of the seventeenth data path 187, 203 is shared with the fifth data path 187, 188.

As mentioned hereinbefore, the fifth data path 187, 188 runs from the first data transfer unit 128 to the first cryptography unit 133. An eighteenth data path 221, 222 runs from the module bus 140 to the first cryptography unit 133. A nineteenth data path 223 runs from the first cryptography unit 133 to the module bus 140.

A twentieth data path 224 runs from the module bus 140 to a first input of an eighth selector $171_8$. A twenty-first data path 221, 225 runs from the module bus 140 to a second input of the eighth selector $171_8$. A section 221 of the twenty-first data path 221, 225 is shared with the eighteenth data path 221, 222. A twenty-second data path 226 runs from the output of the eighth selector $171_8$ to the second cryptography unit 134. The eighth selector $171_8$ is used for switching the twenty-second data path 226 into the second cryptography unit 134 between the twentieth and twenty-first paths 224, 225 from the module bus 140 in performance mode and safety mode respectively.

A twenty-third data path 227 runs from the output of the seventh selector $171_7$ to the second cryptography unit 134. A twenty-fourth data path 228 runs from the second cryptography unit 134 to a first input of a ninth selector $171_9$. The second input of the ninth selector $171_9$ receives an inactive value. A twenty-fifth data path 229 runs from the output of the ninth selector $171_9$ to the module bus 140.

Referring still to FIG. 7, the SPSS 148 includes configuration registers 230, state monitoring logic 231, a scheduler 232 (for automatic mode) and timer 233.

The SPSS 148 controls the selectors 171 to switch between the two modes on request from the safety core (on-demand switching mode) or automatically based on the scheduler 232 (automatic mode). The state (i.e., which input is selected for the output) of each of the selectors 171 is monitored using the feedback signal 173 to the SPSS 148. If the reported state is not as expected, then an error signal is notified to the error module 152 for handling.

Operation (On-Demand Switching)

Figure 8A:
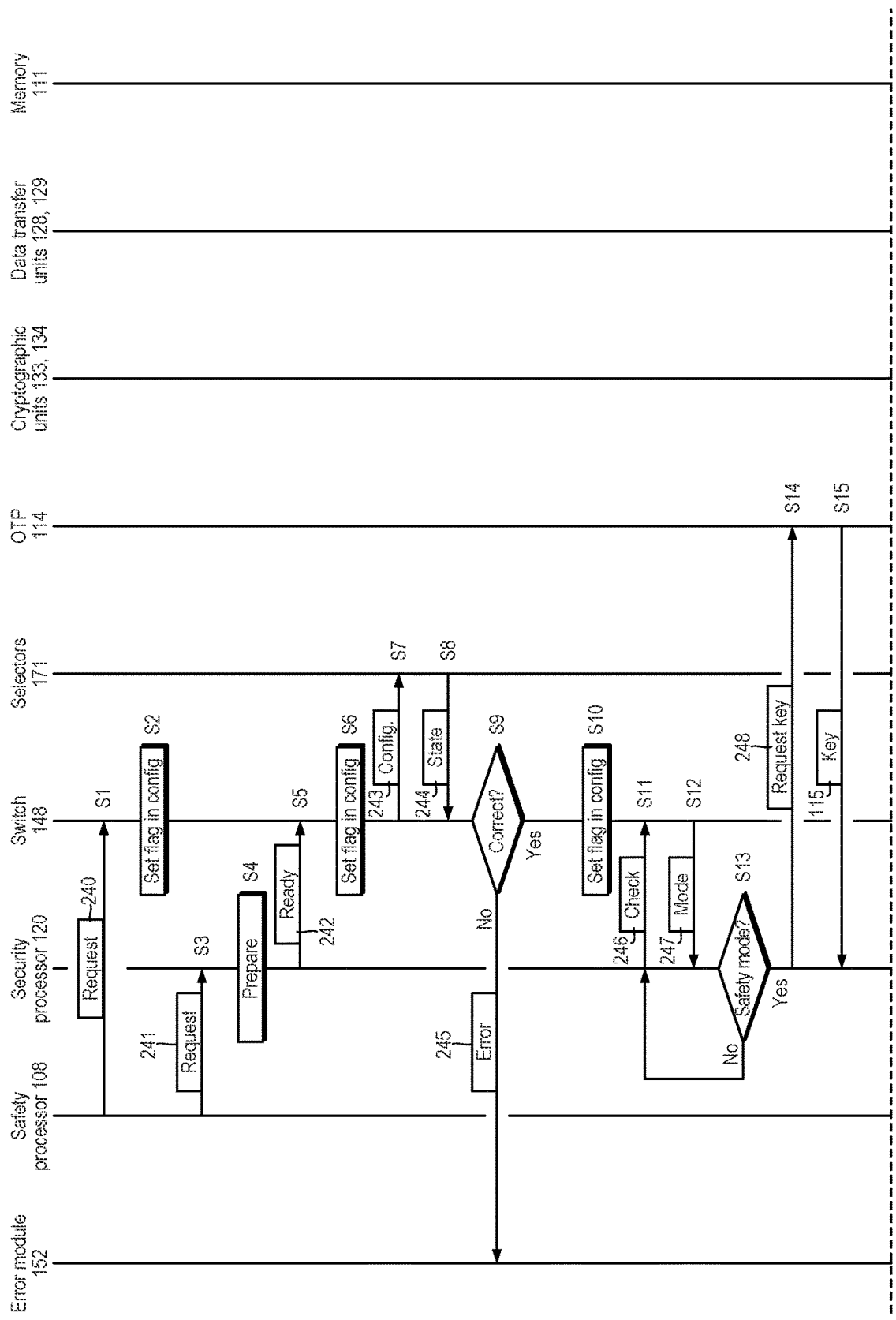
FIGS. 8A and 8B show a process flow diagram of a method of operating of the HSM and the safety-performance secure switch shown in FIG. 3.
Figure 8B:
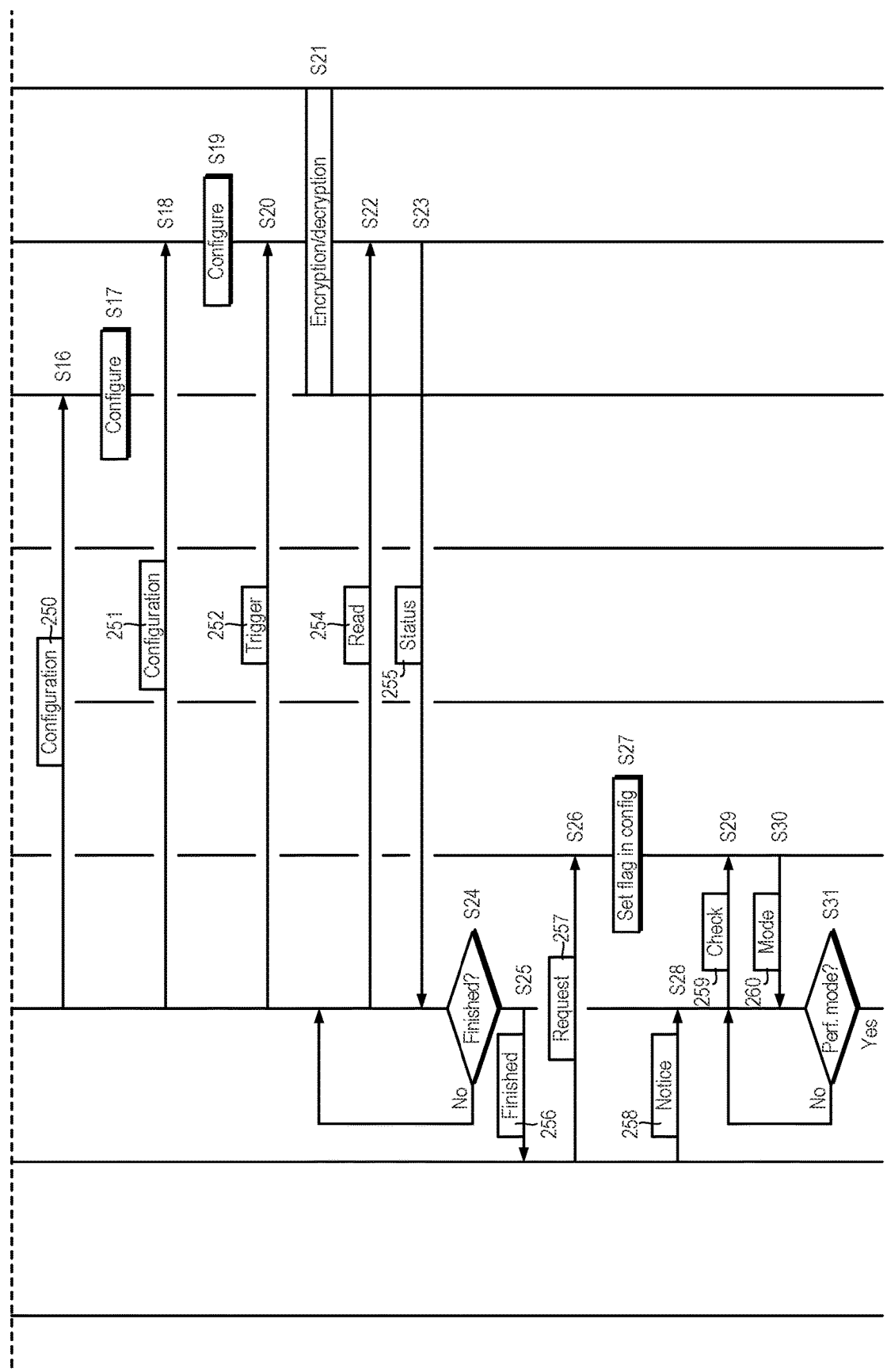

Referring to FIGS. 7, 8A and 8B, operation of the secure computing module 102 and the SPSS 148 during on-demand switching will now be described.

The safety processor 108 sends a request 240 to the SPSS 148 to set a flag in the configuration registers 230 to switch to safety mode (steps S1 & S2) and sends a request 241 to the secure processor 120 to encrypt/decrypt data stored in shared memory 111 (step S3). The secure processor 120 may prepare, for example, by completing processing of secure, non-safety-related data (step S4). The SPSS 148 waits until secure processor 120 notifies the SPSS 148 that it is ready for the mode switch by writing to a dedicated register 230 in the SPSS 148 (steps S5 & S6). The SPSS 148 sets the selectors 171 accordingly (step S7). In this case, input '1' is selected.

The SPSS 148 checks the state of each of the selectors 171 using the state monitoring function 231 (step S8). If any of the selectors 171 returns the wrong state, then the SPSS 148 sends an unintended mode error message 245 to the error module 152 (step S9). The check need not be a check at a single point in time. The SPSS 148 may continuously perform check (whether in performance or in safety mode) to confirm proper functioning. Once the SPSS 148 has confirmed that the selectors 171 are in the proper states, it writes the current mode (i.e., safety mode) in a dedicated internal register 230 (step S10).

After a short wait time, the secure processor 120 reads and checks the new mode (i.e., that is, safety mode) (steps S11, S12 & S13). If in the new mode the secure processor 120 loads keys 115 from the OTP 114 (steps S14 & 15) and configures the cryptographic units 133, 134 accordingly (steps S16 & 17). In this case both cryptographic units 133, 134 are configured to receive the same data to provide redundancy. The secure processor 120 then configures the data transfer units 128, 129 to retrieve target data subject to encryption/decryption from the shared memory 111 (steps S18 & 19) and triggers it (step S20).

The data transfer units 128, 129 load data from shared memory 111 and provide it to the cryptographic units 133, 134 for encryption/decryption and tag generation (step S21). The cryptographic units 133, 134 continue to perform encryption/decryption as long as the data transfer units 128, 129 supply new data. Encrypted/decrypted data are stored in the shared memory 111. The secure processor 120 reads data transfer configuration data (step S22 & S23) and, if processing has finished, notifies the safety processor 108 that operations have completed (steps S24 & 25).

The safety processor 108 sets a request 257 to switch back to performance mode in the internal register 230 in the SPSS 148 and notifies the secure processor 120 accordingly (step S26 & S27).

The secure processor 120 reads and checks the performance mode is entered (steps S29 & S30). If in performance mode, the secure computing module 102 proceeds with the next data (step S31). Any requests for performance mode are buffered while in safety mode.

Operation (Automatic Switching)

Referring to FIGS. 7 and 9, for fully synchronous secure communication, the SPSS 148 can operate to schedule switching to/from the safety mode 154.

The SPSS 148 includes a scheduler 232 and a timer 233. The scheduler 232 can perform switching without a dedicated request from the safety core 108.

In one example, time is counted and, depending on a programmed limit (which can vary), the scheduler 232 issues a trigger 274. Programmable timer thresholds T1 and T2 are used for switching to safety mode and back to performance mode respectively. Typically, T1>T2, i.e., the secure computing module 102 operates in performance mode for a longer period of time than in safety mode.

Accelerating Start Up

Figure 10:
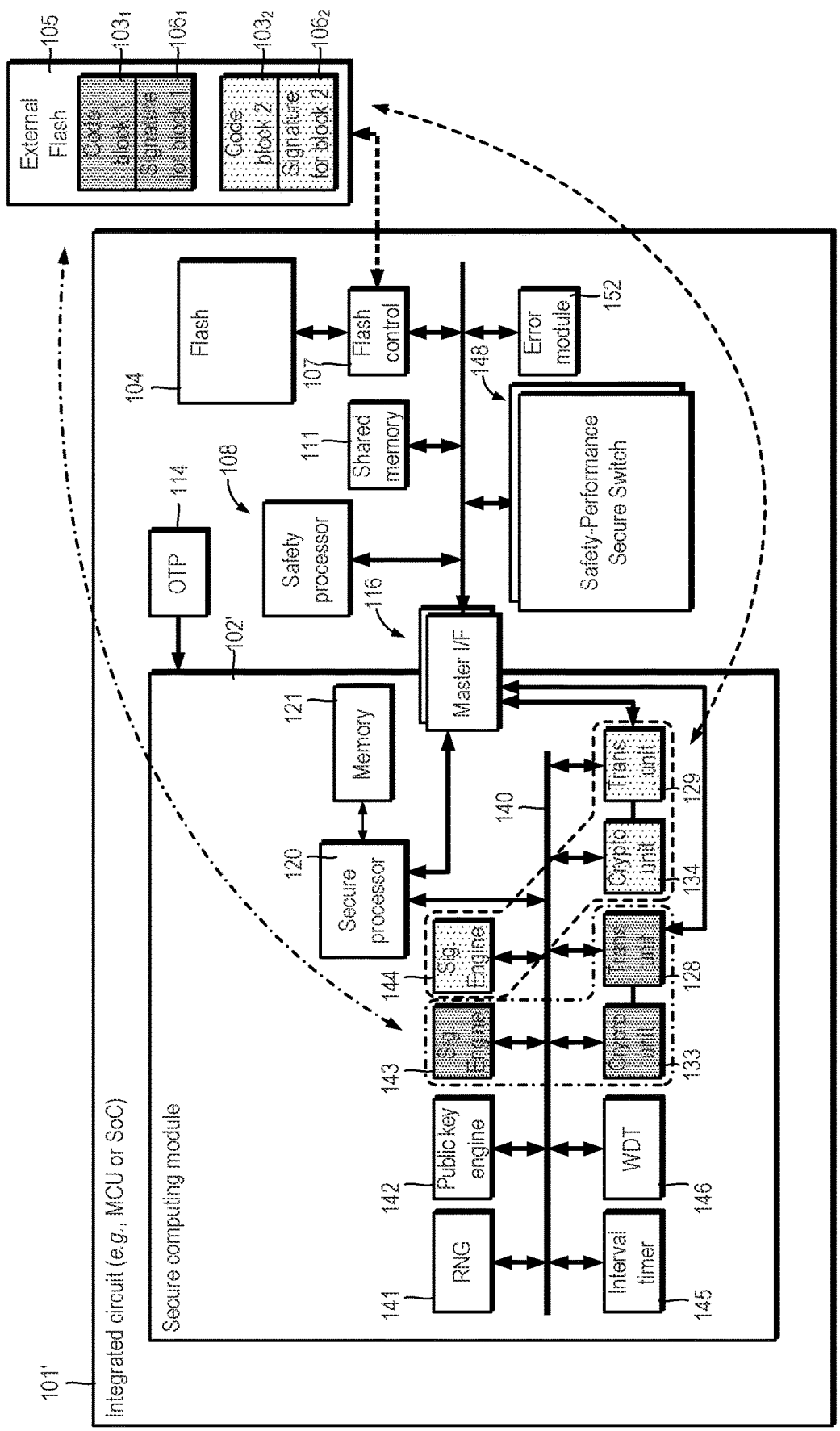
FIG. 10 is a block diagram illustrating an integrated circuit having two hash engines capable of faster secure booting.

Referring to FIG. 10, a fourth integrated circuit 101' is shown. The fourth integrated circuit 101' is the same as the third integrated circuit 101 (FIG. 3), but differs in that it includes an additional signature or hash engine 144 in the secure computing module 102. The interrupt controller 122 (FIG. 3), clock 124 (FIG. 3) and selector circuitry 131 (FIG. 3) are omitted and the data transfer units 128, 129 and cryptography units 133, 134 presented in a simplified form for clarity.

When the device 101' is powered on, the default mode is the performance mode.

If two signature or hash engines 143, 144 are implemented inside the secure computing module 102, it is possible to accelerate the secure boot. In particular, one set of data transfer unit 128, cryptography unit 133 and signature or hash engine 143 can execute the secure boot on one code block 1031 using its corresponding signature or hash 1061 while the other set of data transfer unit 129, cryptography unit 134 and signature or hash engine 144 can execute the secure boot on another code block 1032 using its corresponding signature or hash 1062 in parallel. The signature or hash engines 143, 144 are used to generate a local signature or hash (not shown) for comparing with a received signature or hash 1061, 1062.

Motor Vehicle

Figure 11:
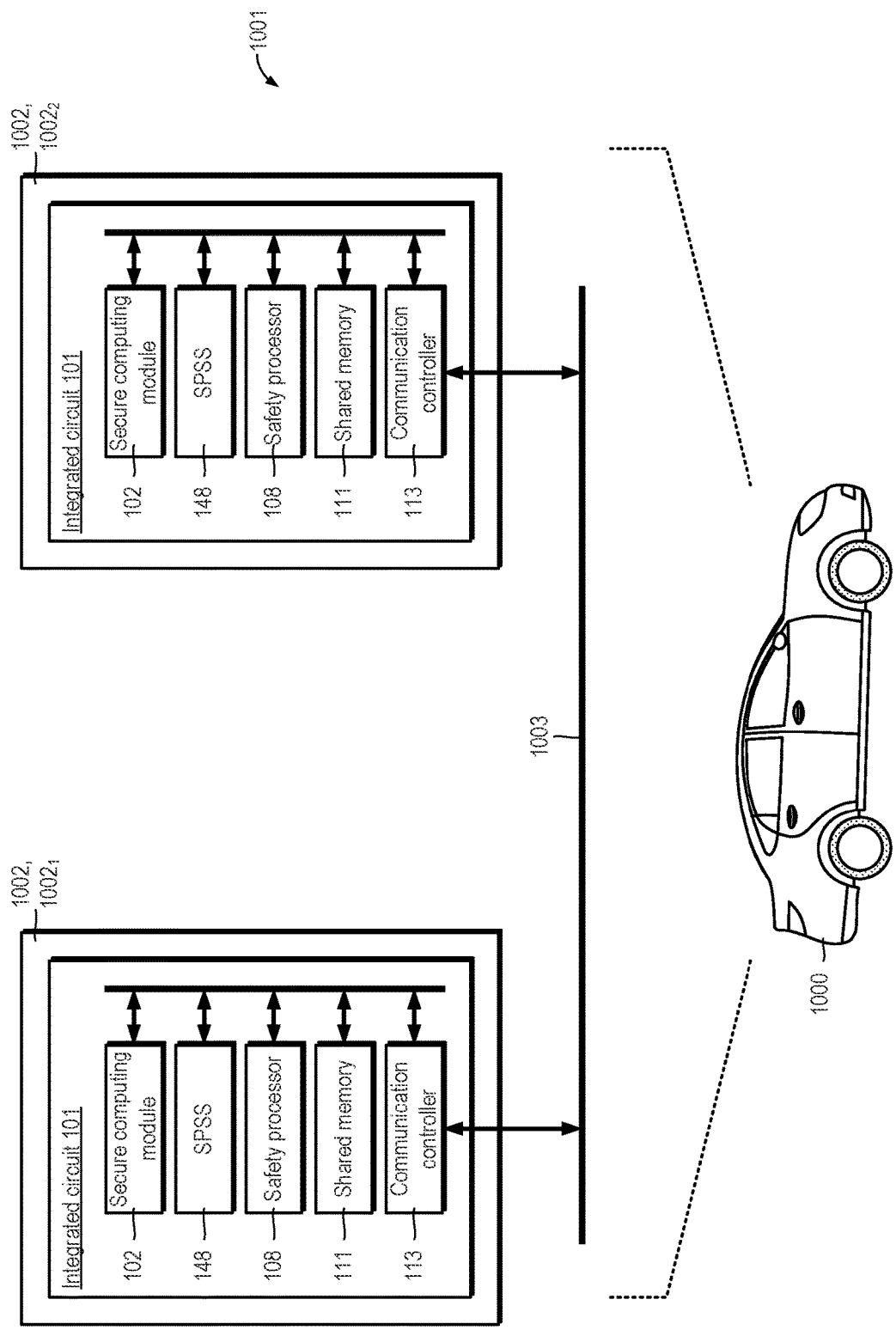
FIG. 11 is a schematic diagram of a motor vehicle which includes integrated circuits, capable of switching between performance and safety modes using a safety-performance secure switch.

Referring to FIG. 11, a motor vehicle 1000 is shown in which a communications network 1001 is deployed which includes nodes 1002, 10021, 10022 connected to a bus 1003. The communications network 1001 may be an Ethernet network, a controller area network (CAN) operable to CAN 2.0 and/or CAN FD standards, or FlexRay. There may be more than one network and there may be two or networks of different types.

Each node 1002 comprises an integrated circuit 101 as hereinbefore described which is capable of dynamic switching between performance and safety modes 153, 154. For clarity, only two nodes are shown.

Modifications

It will be appreciated that various modifications may be made to the embodiments hereinbefore described. Such modifications may involve equivalent and other features which are already known in the design, manufacture and use of integrated circuits for use in functional safety and security and component parts thereof and which may be used instead of or in addition to features already described herein. Features of one embodiment may be replaced or supplemented by features of another embodiment.

Other forms of error detection can be used. For example, if a safety level permits, single core with self-check or simple redundancy (without time diversity) may be used.

The data transfer units can take other forms such as data transfer system (DTS) or data transfer function (DTF)

Other forms of block cipher may be used instead of AES, such as SM4. Other forms of authenticated encryption may be used instead GCM. For example, Cipher Code Block (CBC), Output Feed Back (OFB), Cipher Feed Back (CFB), Counter (CTR), cypher chaining message (CCM), ChaCha20-Poly1305, or XEX-based tweaked-codebook mode with ciphertext stealing (XTS) may be used.

Additional safety mechanisms, such as cyclical redundancy code (CRC), may be provided, for example, to help support higher safety levels.

Other implementations of selector circuitry can be used.

The integrated circuit can be used in other domains, not just automotive. For example, the integrated circuit may be used in other transport applications (such as aviation), medical application or industrial application.

Although claims have been formulated in this application to particular combinations of features, it should be understood that the scope of the present disclosure also includes any novel features or any novel combination of features disclosed herein either explicitly or implicitly or any generalization thereof, whether or not it relates to the same embodiment as presently claimed in any claim and whether or not it mitigates any or all of the same technical problems as does the present disclosure. The applicant hereby give notice that new claims may be formulated to such features and/or combinations of such features during the prosecution of the present application or of any further application derived therefrom.

What is claimed is:

1. An integrated circuit comprising:
   a safety processor;
   a memory;
   a secure computing module comprising:
      a secure processor;
      first and second cryptographic units for encrypting and decrypting data in the memory; and
      first and second data transfer units for transferring data between the memory and the first and second cryptographic units respectively,
      wherein the first cryptographic unit and the first data transfer unit provide a first cryptographic data handling system, and the second cryptographic unit and the second data transfer unit provide a second cryptographic data handling system; and
   a switch,
   wherein the secure computing module further comprises:
      selector circuitry for selectively coupling and uncoupling the first and second cryptographic data handling systems in response to control signals from the switch, such that:
         in a first mode, the first and second cryptographic data handling systems are uncoupled and operable independently of each other; and
         in a second mode, the first and second cryptographic data handling system are coupled and operable together to provide hardware redundancy,
   wherein the secure computing module further comprises a first cryptographic signature or hash engine and a second cryptographic signature or hash engine, and
   wherein:
      the first cryptographic data handling system and the first cryptographic signature or hash engine are operable to process a first code block in a booting process; and
      the second cryptographic data handling system and the second cryptographic signature or hash engine are operable to process a second code block during the booting process.

2. The integrated circuit of claim 1, wherein:
   in the first mode, the first cryptographic data handling system is operable to process first data stored in the memory and the second cryptographic data handling system is operable to process second, different data stored the memory, simultaneously; and
   in the second mode, the first and second cryptographic data handling systems are operable to process the first and second data sequentially.

3. The integrated circuit of claim 1, wherein, the safety processor is configured, in response to receiving or transmitting encrypted safety data, to send a request to the switch to cause the secure computing module to switch from the first mode to the second mode.

4. The integrated circuit of claim 1,
   wherein the switch comprises state monitor,
   wherein the selector circuitry comprises a set of selectors, and
   wherein each selector in the set of selectors is arranged to communicate its state to the state monitor and wherein the switch is configured to determine the respective states of the selectors in the set of selectors and, upon determining the respective states are correct, to switch between a first state and a second state.

5. The integrated circuit of claim 1, further comprising:
   a communications controller for receiving and transmitting data from a bus,
   wherein the communications controller is operable to:
      receive received data and to store the received data in the memory; and
      retrieve transmit data from the memory and to transmit the transmit data.

6. The integrated circuit of claim 1, wherein the switch comprises:
   a scheduler; and
   a timer,
   wherein the scheduler is configured:
      in response to the timer reaching a first pre-defined value, to cause the secure computing module to switch from the first mode to the second mode, and
      in response to the time reaching a second pre-defined value, to cause the secure computing module to switch from the second mode to the first mode.

7. The integrated circuit of claim 1, further comprising:
   an error module,
   wherein the switch is configured to monitor states of selectors in the selector circuitry and, in response to a given selector or the switch determining that the given selector is in an erroneous state, the given selector and/or switch sending an error signal to the error module.

8. The integrated circuit of claim 1, wherein the hardware redundancy is sufficient to support Automotive Safety Integrity Level (ASIL) level D.

9. The integrated circuit of claim 1, wherein the integrated circuit is a microcontroller or a system-on-a-chip.

10. A vehicle comprising:
a bus; and
at least two nodes arranged to communicate via the bus, each node comprising the integrated circuit of claim 1.

11. A switching method comprising:
selectively coupling and uncoupling, by a secure computing module, first and second cryptographic data handling systems, wherein the first cryptographic data handling system comprises a first cryptographic unit and a first data transfer unit, and the second cryptographic data handling system comprises a second cryptographic unit and a second data transfer unit, such that:
in a first mode, the first and second cryptographic data handling systems are uncoupled and operable independently of each other; and
in a second mode, the first and second cryptographic data handling system are coupled and operable together to provide hardware redundancy,
wherein the secure computing module comprises a first cryptographic signature or hash engine and a second cryptographic signature or hash engine, and
wherein:
the first cryptographic data handling system and the first cryptographic signature or hash engine are operable to process a first code block in a booting process; and
the second cryptographic data handling system and the second cryptographic signature or hash engine are operable to process a second code block during the booting process.

12. The switching method of claim 11, comprising:
coupling the first and second cryptographic data handling systems in response to a request from a safety processor; and
later, uncoupling the first and second cryptographic data handling systems.

13. The switching method of claim 11, comprising:
coupling the first and second cryptographic data handling systems in response to a timer value reaching a predetermined timer value threshold; and
later, uncoupling the first and second cryptographic data handling systems.

* * * * *